No. 803,948. PATENTED NOV. 7, 1905.
W. J. WHITING.
AUTOMATIC FIREARM.
APPLICATION FILED AUG. 29, 1904.
5 SHEETS—SHEET 5.
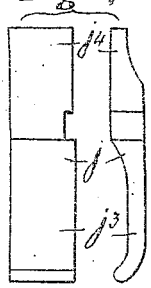
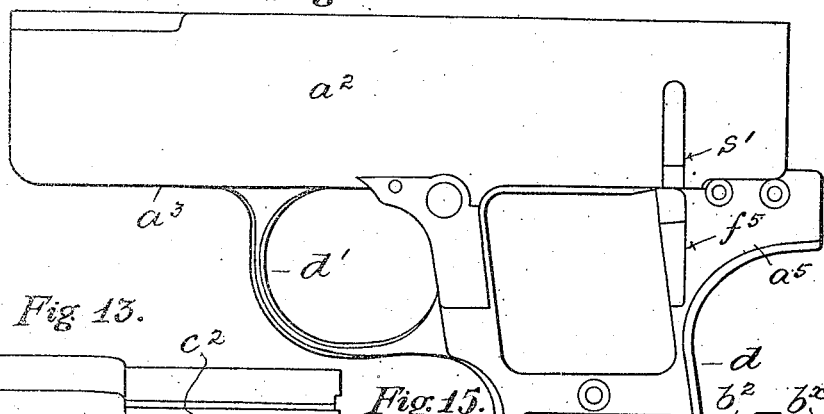
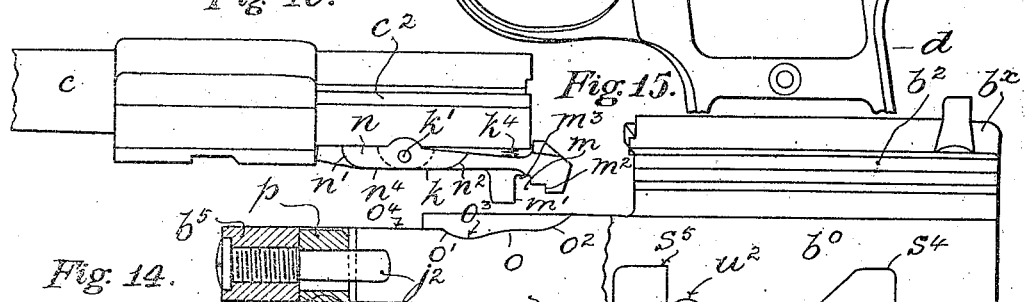
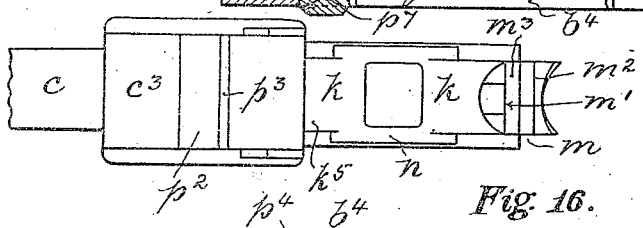
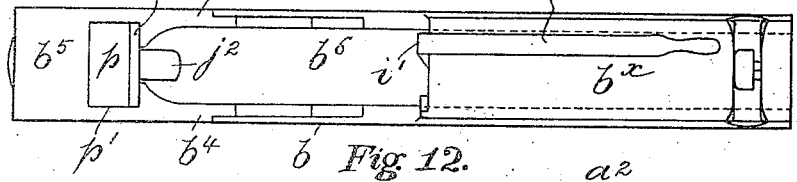
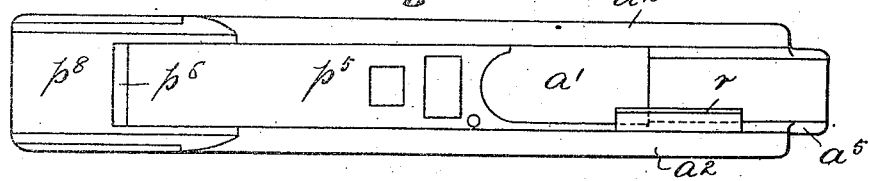

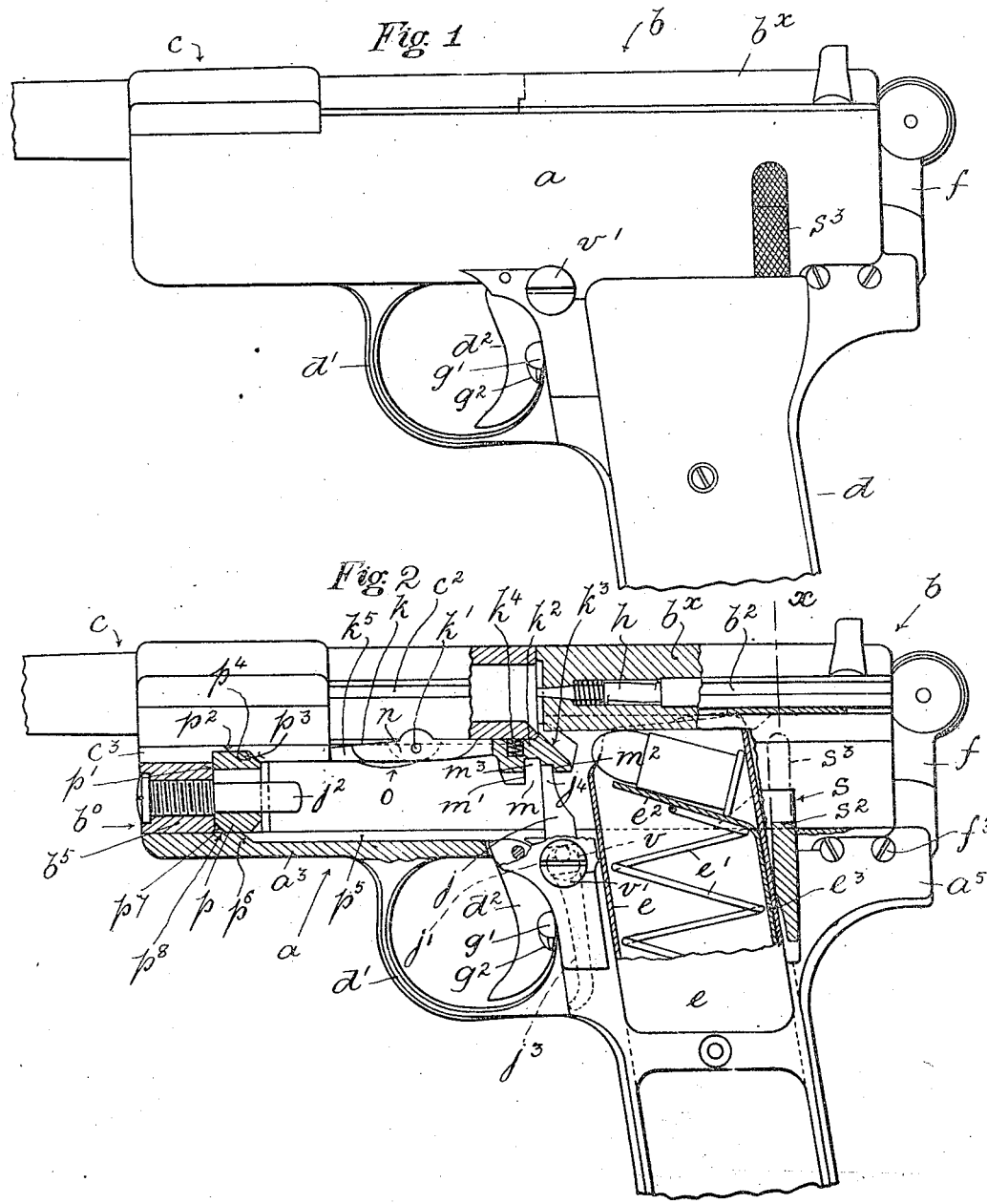

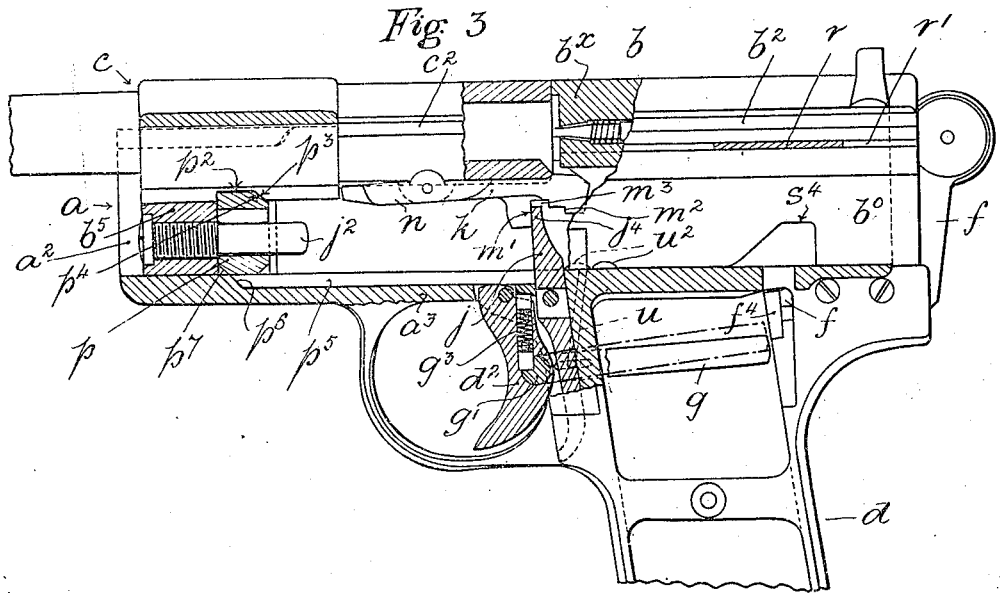
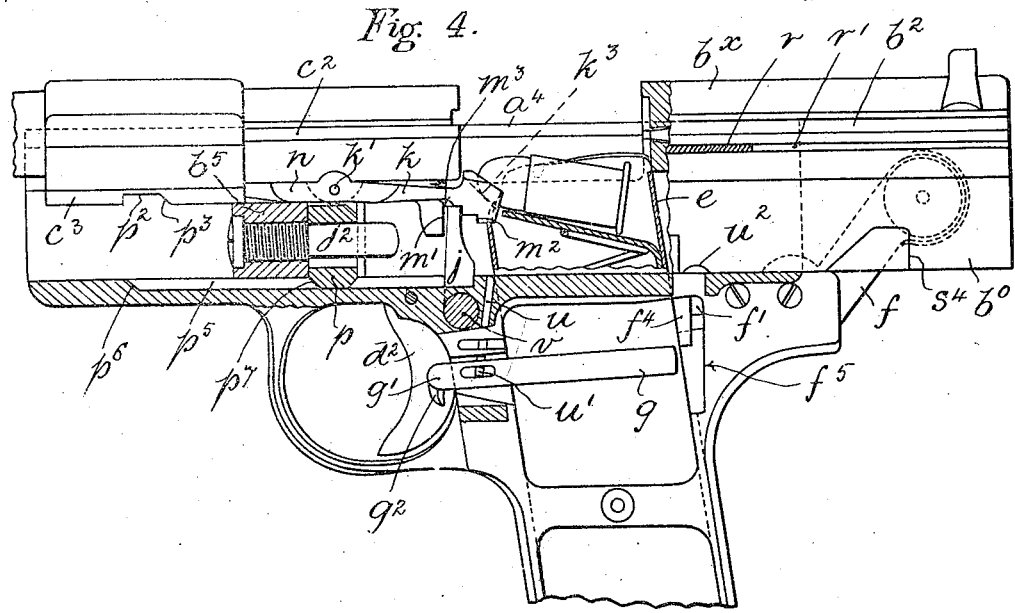

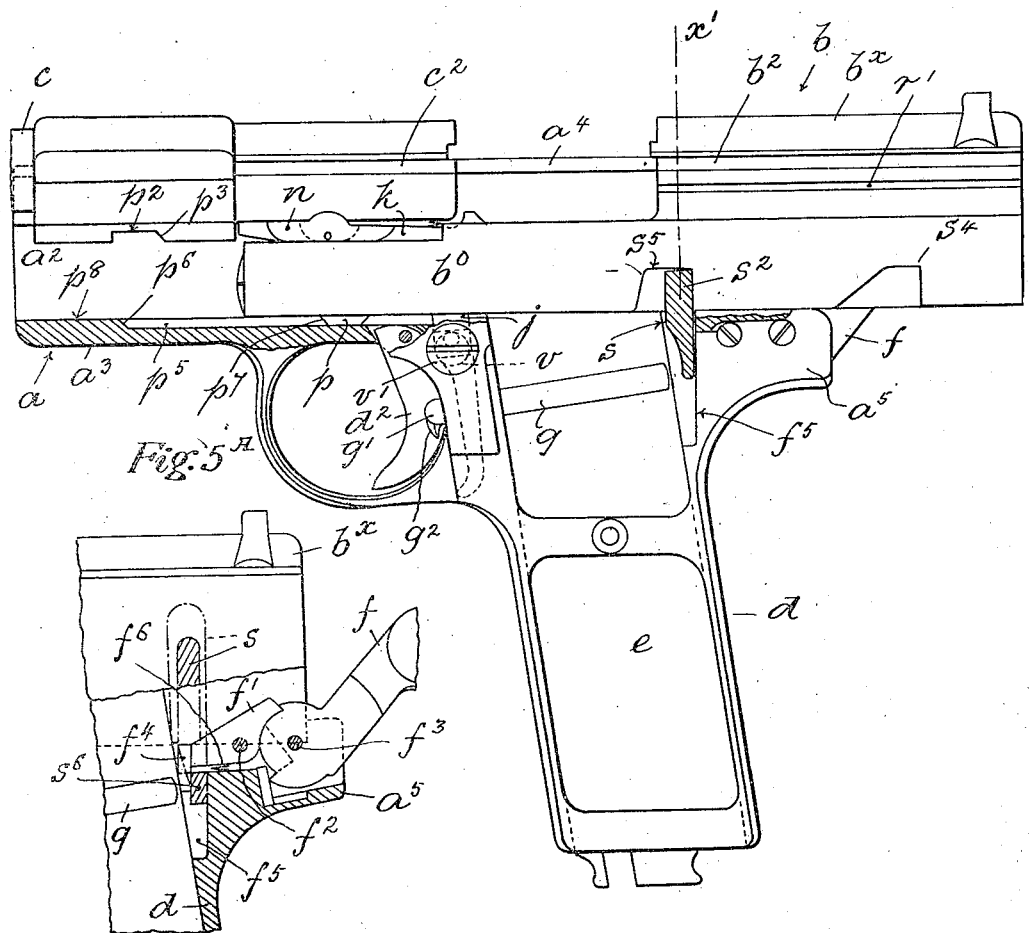

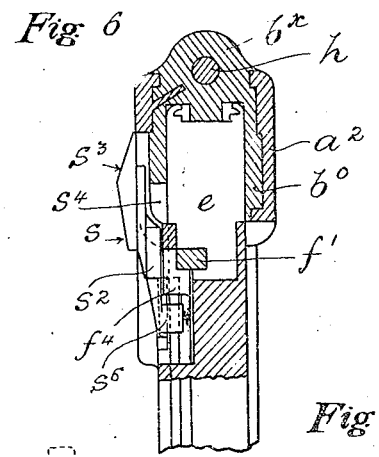
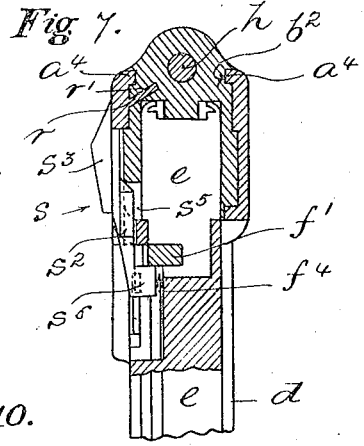
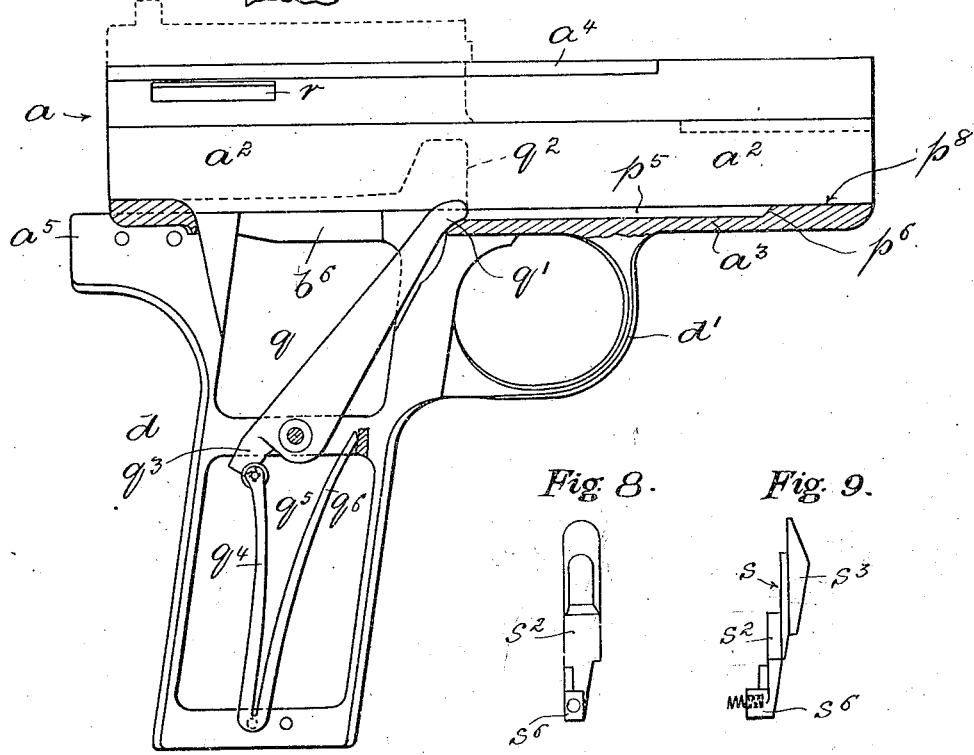
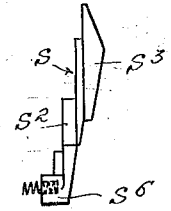

UNITED STATES PATENT OFFICE.

WILLIAM JOHN WHITING, OF BIRMINGHAM, ENGLAND.

AUTOMATIC FIREARM.

No. 803,948.            Specification of Letters Patent.            Patented Nov. 7, 1905.

Application filed August 29, 1904. Serial No. 222,615.

*To all whom it may concern:*

Be it known that I, WILLIAM JOHN WHITING, director of company, a subject of the King of Great Britain, residing at Weaman street, Birmingham, England, have invented certain new and useful Improvements in Automatic Firearms, of which the following is a specification.

This invention has relation to automatic pistols and other firearms of that type in which the sequence of operations involved in the firing of a shot and the reloading of the arm—viz., the unlocking and opening of the breech after discharge, the extraction and ejection of the empty cartridge-shell, the cocking of the hammer, the insertion of a fresh cartridge from the magazine into the barrel-chamber, and the reclosing of the breech—are performed automatically by the movements of a sliding or traversing breech-block, first in a backward direction under the influence of the recoil energy developed by the discharge of a cartridge and then in a forward direction, under the influence of a return-spring rendered active by the initial or rearward movement of the said block.

The present invention has for one of its objects to provide an automatic pistol or firearm of simple and strong construction in which the number of moving parts is reduced to a minimum, thereby insuring rapidity and certainty in action without liability to get out of order when in use.

Other objects of the said invention are to provide such firearms with improved automatic catches or fastening mechanism for locking both the breech-block and the barrel to one another and to the body of the arm, the whole of the said mechanism being covered up or inclosed within the said body, whereby it is thoroughly protected from damage or derangement; also, to provide a combined safety-catch whereby both the breech-block and the firing mechanism can be locked in certain positions; also, to simplify and improve the arrangement of the spring-actuated mechanism for returning the breech-block; also, to provide means for preventing double shots due to the unintentional firing of the pistol by an involuntary pull upon the trigger, which is apt to be occasioned by the recoil from a discharge, and also to generally arrange and construct the weapon in such a way as to admit of the principal parts being readily detached from one another or disassembled so as to facilitate cleaning, replacement, or repair.

Figure 1 of the accompanying drawings represents a side elevation of an automatic pistol constructed in accordance with this invention and shows the breech-block closed and all the other parts in their normal positions. Fig. 2 is a view, partly in longitudinal vertical section and partly in elevation, of the said pistol, showing the several parts in the same positions as in Fig. 1. In this view one of the side plates of the handle or grip, which also serves as a container for the detachable magazine, is removed in order to show more clearly the arrangement of the said magazine and the safety-slide which locks the breech-block in its open and closed positions and also blocks the sear of the lock, and thus acts as a safety-bolt for the firing mechanism. The said view further represents the construction and arrangement of the automatic devices provided for locking the breech-block and the barrel to one another and to the body of the pistol. Fig. 3 is a similar view, partly in longitudinal section and partly in elevation, to Fig. 2, but it shows the positions assumed by the respective parts of the pistol immediately after a cartridge has been discharged and when the breech-block is on the point of being disengaged or released from the barrel to which it is normally locked and is about to commence its independent rearward traverse under the influence of the recoil from the said discharge. Fig. 4 shows the pistol with the breech-block fully opened or at the end of the rearward traverse which it makes under the influence of the recoil set up by the discharge of a cartridge. This view also shows the arrangement of the means provided for preventing double shots by throwing and holding the sear-actuating mechanism out of gear during the rearward and return movements of the breech-block. Fig. 5 is another view of the pistol with the breech-block at the end of its rearward traverse and showing how the said block may be locked in this position. Fig. 5ᴬ is a view of a part of the pistol, showing the arrangement of the firing mechanism and the safety-slide which acts thereon. Fig. 6 represents a transverse vertical section upon the dotted line $x$, Fig. 2, showing particularly the arrangement of the combination safety-catch which blocks the firing mechanism when the hammer is cocked and also locks the breech-block in both its closed and open positions. This view shows the catch in its normal or inoperative position. Fig. 7 is a similar sectional view of the pistol to that represented in Fig. 6; but the section is taken upon the dotted line $x'$, Fig. 5, and shows the catch lifted into engagement with the breech-block and with the sear of the firing mechanism, the said sear being shown in transverse section. Figs. 8 and 9 show an edge view and an elevation of the sliding catch separately. Fig. 10 is a sectional view of the body of the arm, showing the arrangement of the improved spring mechanism provided for returning the breech-block and barrel to their normal positions after making their rearward movements. In this view the breech-block is indicated by dotted lines. Fig. 11 is an elevation of the body part of the pistol separately. Fig. 12 is a top side plan of the same. Fig. 13 is an elevation, and Fig. 14 an under side plan, of the barrel with the latch or fastening device which is fitted thereto for securing same to the body of the pistol. Fig. 15 is an elevation with the fore part in longitudinal vertical section of the combined breech-block and carriage which reciprocates within the body part of the pistol, and Fig. 16 is a top side plan of the same. These views show the arrangement of the self-acting bolt by which the said breech-block and carriage is automatically locked to and released from the barrel, also the form and disposition of the cams which are provided for actuating the latch which retains the barrel within the body, but admits of the said barrel having a limited movement both backwardly and forwardly with the breech-block. Fig. 17 shows a separate elevation and an edge view of the spring-buffer which is carried by the body and is engaged by the barrel-latch and serves both as a means for limiting the collective rearward and forward movements of the breech-block and barrel and for retaining the said barrel in its assigned position within the body.

The same letters of reference indicate corresponding parts in the several figures of the drawings.

The automatic pistol represented in the drawings embodies in its construction three principal parts—viz., a frame or body $a$, a combined breech-block and carriage $b$, having a rectilinear traverse to and fro within the said body, and a barrel $c$, mounted in the body and above a part of the carriage which moves to and fro thereunder. The said frame or body is carried upon the top of a hollow handle or grip $d$, the inside of which constitutes a magazine-chamber open at top and bottom and adapted to contain a detachable magazine $e$, which holds a number of cartridges and is fitted with the usual feed-spring $e'$ and rising platform $e^2$, whereby the said cartridges are fed up singly or one at a time into the path of the breech-block prior to the latter commencing its forward movement after having been thrown back by the recoil energy. The trigger-guard $d'$ and trigger $d^2$ are arranged at the front of the handle, while the hammer $f$ and other parts of the lock mechanism are fitted behind said handle, and motion is transmitted from the trigger to the sear $f'$ of the lock through a bar or limb $g$, directed across the side of the magazine-chamber, as hereinafter described.

The body proper, which is machined to a deep channel-section transversely and is open at both ends, is mounted in a horizontal position upon and projects forwardly some distance beyond the magazine-handle, while its bottom near the rear or after end is cut away to form a clearance $a'$, which coincides with the open top end of the magazine-chamber and wherethrough the upper end of the detachable magazine-box extends, as shown in Figs. 2 and 4, when pushed fully home. The upright side walls $a^2$ of the said body stand at a right angle to the flat bottom $a^3$, and suitable rectilinear ribs $a^4$ are formed along their inner sides to engage corresponding guide-grooves $b^2 c^2$, which are formed in line with one another upon the opposed sides of the traversing breech-block and of the after part or breech end of the barrel, so that the said channeled body constitutes an open-ended raceway wherein the said carriage and breech-block and also the after part of the barrel are confined laterally, but are nevertheless free to make certain traversing movements therein, as hereinafter fully described.

The breech-block and carriage and the after part of the barrel of the arm are both mounted between the sides of the body; but whereas the former is capable of a considerable reciprocating movement the latter is confined to the body by special devices which only admit of the said barrel having a slight initial movement bodily with the breech-block and carriage when the arm is discharged, this said initial and collective movement of the two parts being utilized for the purpose of placing them in such positions with respect to the body as will admit of the automatic disconnection of the breech-bolt or fastening device which normally locks the barrel and breech-block solidly together; but when the said bolt is disengaged on the pistol being fired then the breech-block is liberated or disconnected from the barrel and is free to be traversed back alone under the influence of the recoil energy, as hereinafter further described.

The breech-block proper, $b^{\times}$, is arranged or mounted in the same axial line as the barrel, and when in its closed position (see Fig. 2) its forward end fits close up against the barrel breech-face and is there locked automatically by the catch device above referred to. The firing-pin $h$ is fitted within the said block and is adapted to be struck by the hammer $f$, which is pivoted at $f^3$ between a pair of cheeks or extensions $a^5$ at the after end of the body, while the top side of the block is fitted with a spring extractor-limb $i$, having a hooked forward end $i'$, which, on the said block being brought home against the barrel breech-face, will snap over the rim of the cartridge lying in the barrel-chamber, so that on the breech-block making its next rearward movement after the said cartridge has been fired the extractor will withdraw the spent shell and leave the chamber clear for the insertion of the next cartridge fed up from the magazine. The breech-block is located upon the rearward end of, and is preferably made in a piece with, its carriage $b^0$, which takes the form of a frame consisting of a pair of separated and upright sides $b^4$, adapted to fit and work within the lower part of the raceway in body and a solid cross-piece $b^5$, connecting together the forward ends of the carriage sides, while their rearward ends are connected together by and serve as supports for the superimposed breech-block, which is thus elevated above the longitudinal space or clearance $b^6$, that extends from the forward cross-piece throughout the whole length of the carriage to the rear open end to admit of the said carriage passing freely over the cocked hammer during both its rear and forward movements. The distance between the sides of the clearance in the carriage is equal to the width of the magazine-box, so that the upper end of the said box on being forced home will extend into the forward part of the said clearance and also project to such an extent above the top of the carriage, as shown in Fig. 2, that when the breech-block and carriage are at the end of their rearward movement the magazine-spring will bring the uppermost cartridge into the path of the breech-block, which will force the said cartridge into the chamber of the barrel during its return movement. The carriage-frame is preferably made of the same length as the body, so that when the parts are in their normal positions, as shown in Fig. 1, the front end of the said carriage comes flush with the front ends of the body sides, and the rear or bearer face of the breech-block is also flush with the rearward ends of the said body sides. The barrel is arranged to come above the forward part of the carriage and in the same axial line as the breech-block, and its rearward or chamber end is machined with a flat-sided base $c^3$, which fits within the upper and forward part of the raceway in the body, so that when the several parts of the pistol are in their normal positions the front of the breech-block lies close up against the inner end of the barrel, and the forward portion of the carriage lies underneath the base of the said barrel and is locked thereto by the breech-fastening device.

For retaining the barrel within the body and limiting the rearward and forward movements of the carriage and breech-block under the influence of the recoil energy and the action of the return-spring, respectively, the pistol is provided with a yielding or spring stop, which is engaged by a latch fitted on the under side of the barrel, and is so arranged that it will also buffer or cushion the moving parts and prevent the same being damaged by the impact in either direction. This stop consists of an upright limb or arm $j$, which is jointed by means of a cross-pin $j'$ to the body and extends vertically upward from the bottom or bed of the said body into the longitudinal clearance of the carriage, the forward cross-piece of which is fitted with a horizontally-directed pin $j^2$ or other projection adapted to strike against the front side of the said stop when the carriage reaches the prescribed limit of its rearward movement, and to provide for the cushioning or buffering action the stop is formed with a spring limb or extension $j^3$, which hangs below the joint and has its abutment against a solid part of the frame, so that the said stop will yield slightly under the impact when struck by the carriage. The upper end of the spring stop-limb is also indirectly connected with the barrel, so that it will also serve to cushion or buffer the impact of the return movement of the carriage and breech-block as the force of the blow delivered by the breech-block against the said barrel is transmitted through the latter to the spring-limb and is absorbed or neutralized thereby.

In order to secure the barrel within the raceway of the body and positively lock the same against further movement in either direction during the time that the breech-block is making its independent rearward and return movements, the said barrel is provided with a latch device whose position with respect to the upper end of the yielding buffer-stop is varied by an arrangement of double-acting cams and wiper-inclines, the actions of which are controlled by the reciprocating movement made by the breech-block carriage after the latter has been disconnected from the barrel. This barrel-latch consists of a rocker $k$ transversely pivoted by a cross-pin $k'$ to a lump on the under side of the barrel-base, so as to be capable of a limited angular movement in the longer direction of the pistol, and having its rearward end $k^2$ extended beyond the barrel breech-face and formed with an inclined lead or guide $k^3$, adapted to assist in directing the cartridges into the chamber as they are pushed forward out of the upper end of the magazine by the breech-block. A spring $k^4$ may be interposed between the rearward end of the latch and the under side of the barrel-base, while a part $k^5$ of the said latch extending forwardly beyond its pivot serves as a means for limiting the angular movement on being taken against the under side of the said base either by the expansion of the spring or by the action of cam devices provided for that purpose. The under side of the rearward end of the latch is formed with a rectangular and stepped recess $m$, with which the upper end or nose $j^4$ of the buffer-stop is always in engagement when the parts of the pistol are assembled. The length of this recess is equal to the limited rectilinear movement which the barrel is intended to have, and its forward and rearward sides $m'$ $m^2$ serve as limiting shoulders or abutments, and the forward shoulder $m'$ is brought against the front of the engaging buffer-stop on the barrel being moved rearwardly under the initial influence of the recoil from a discharge, while the rearward shoulder $m^2$ is taken against the back of the said stop on the said barrel being restored to its normal position, when the breech-block is thrown forward again by the return-spring. The stepping in the top of the recess $m$ is so arranged as to form across the forward part of the same a transverse locking notch or groove $m^3$, and when the barrel is arrested by the abutment of the latch-shoulder $m'$ against the buffer-stop after the said barrel has been moved backward bodily with the breech-block under the influence of the recoil then the rear part of the latch is automatically but positively depressed either by the interposed spring before referred to or by auxiliary means provided specially for that purpose and the transverse locking-notch $m^3$ is made to engage over the nose of the buffer-stop, so that the barrel is securely locked against further movement in either direction during the time that the breech-block and carriage are being driven back by the recoil and brought forward again by the return-spring; but as soon as the front end of the breech-block comes in contact with the barrel breech-face the recessed end of the latch is positively lifted, so as to disengage the locking-notch from the stop, when the barrel is again moved forward through the prescribed distance bodily with the breech-block and carriage until they reach their normal or firing positions, when the whole of the parts are arrested by the rear shoulder $m^2$ of the recess striking against the back of the buffer-stop. It is understood that simultaneously with the arresting of the barrel at the end of its rearward movement the breech-block with its carriage is unfastened or released and first driven back and then returned alone or independently, and this independent reciprocatory motion of the breech-block and carriage is utilized to automatically operate the means provided for positively lowering and raising the latch, and thereby engaging and disengaging its locking-notch from the end of the buffer-stop. These means consist of cam-pieces $n$, arranged on one or both edges of the rocking latch and actuating-inclines $o$, formed on the corresponding sides of the forepart of the carriage and arranged to wipe under and act, respectively, upon the opposite ends of the cams in such a manner that the recessed part of the latch is depressed by the forward inclines $o'$ wiping under the forward ends $n'$ of the cams as the carriage commences to travel rearward without the barrel, while the said recessed part of the latch is raised or tilted in the reverse direction by the action of the rearward inclines $o^2$ in wiping forwardly under the rearward ends $n^2$ of the cams on the breech-block coming against the barrel, when the said block completes its independent forward movement. Preferably the oppositely-acting inclines which wipe under and play upon the latch-cams are formed on the inner sides of the upright walls of the breech-block carriage (see particularly Figs. 15 and 16) and are separated by clearances $o^3$, into which the forward ends of the cams drop when the rearward ends thereof are lifted by the corresponding carriage-inclines for retaining the latch in the raised or disengaging position, which it assumes when the pistol is closed ready for firing, while the forward inclines are continued into straight bearing ledges or rails $o^4$, which traverse or wipe under extended middle flats $n^3$ on the under sides of the latch-cams and prevent the said latch from being tilted or disturbed from its locking position during the latter part of the rearward motion of the carriage and the first part of its return or forward movement.

The breech-block fastening consists of a vertically-sliding bolt $p$, working within an open-ended guide-slot $p'$ in the fore end of the carriage and adapted to be automatically lifted into engagement with a cross-gap $p^2$ in the under side of the barrel-base at the moment when said barrel and carriage complete their collective forward movement, while the disengagement of the bolt and the releasing of the carriage from the barrel is also performed automatically and is timed to synchronize with the locking of the barrel by its latch device on reaching the end of its initial movement. For the purpose of actuating the bolt-block a system of inclined planes is provided, one incline $p^3$ being formed along the rearward edge of the cross-gap under the barrel, and the rearward top edge of the bolt has a corresponding incline $p^4$, while the bed or bottom of the raceway in the body is formed with a longitudinal sinking or clearance $p^5$, which terminates forwardly at some distance from the fore end of the body and has an inclined shoulder $p^6$ across its front, the lower forward edge of the bolt having a corresponding incline $p^7$. The inclines $p^4$ $p^3$ at the upper end of bolt and in the barrel cross-gap are designed to give the lowering or unlocking movement to the bolt, while the inclines $p^7$ $p^6$ at the bottom of bolt and forward end of the body-clearance act to lift said bolt into locking engagement with said barrel cross-gap and lock the barrel to the carriage.

Thus when the parts of the pistol are in their normal positions ready for firing the upper end of the bolt is in engagement with the barrel-gap, as represented in Fig. 2, while its under side lies on the plain or unrecessed forward part $p^3$ of the bed of the body which upholds or retains the said bolt in its locking position until the pistol is discharged, and then by the initial collective movement of the barrel and carriage the bolt is brought over the sinking or depression in the said bed, with the result that as soon as the barrel has been arrested and locked by its latch and the carriage (in which the bolt is mounted) is at the point of commencing its rearward independent traverse the forward incline at the upper end of said bolt is made to wipe under the inclined shoulder of the cross-gap in the stationary barrel and is thereby depressed or forced down out of said gap, so that the carriage is completely freed or disconnected from the barrel, and the lower end of the bolt is brought onto the bottom of the bed-sinking, as represented in Fig. 3, in which it slides, as shown in Fig. 4, during the independent backward and forward movements of the carriage, and at the moment when the said carriage comes forward again and closes the breech-block against the barrel the barrel cross-gap is once more brought coincident with the upper end of the bolt and simultaneously the inclined forward edge $p^7$ at the bottom of said bolt is made to strike against the stationary inclined shoulder $p^6$ at the fore end of the body-sinking, so that as the barrel and carriage slide forward together to complete the movement and bring the parts to the firing positions the inclines cause the bolt to be lifted into locking engagement with the said cross-gap, in which position the said bolt is retained by the solid or plain front part of the bed coming underneath its lower end.

It is to be understood that the collective movement which the barrel and carriage make under the influence of the recoil is only slight, being merely equal to the length of the recess in the latch and sufficient to provide for the bringing of the breech-bolt over the depression or sinking in the body to admit of it being unlocked by the action of the relatively moving inclined surfaces; but these motions are so timed and arranged as to allow the bullet to leave the muzzle of the barrel before the carriage is unlocked, so that the latter does not move independently until the bullet is on its way, and thus the shooter's aim is not likely to be disturbed by the actuation of the reciprocating parts by the initial recoil energy and the rearward independent movement of the carriage is imparted only by that part of the recoil energy which is unexpended after the said carriage has been freed.

The mechanism for returning the carriage and breech-block to the locking position after being arrested by the buffer-stop consists of a long arm or lever $q$, fulcrumed, preferably, to the frame of the magazine-chamber and having its upper end $q'$ extending through the magazine-box clearance $b^6$ at the after end of the bottom of the body and engaging with a suitable recess or bearing $q^2$ in the side of the carriage of the breech-block. Below the fulcrum this lever is formed with a toe or extension $q^3$, against which one limb $q^4$ of an ordinary double-armed gun-spring $q^5$ has its bearing, while the other limb $q^6$ has an abutment against the frame. The normal tendency of this spring is to tilt the lever forward, as shown in Fig. 10, and keep the breech-block in its closed position home against the breech end of the barrel; but when the carriage is driven back by recoil the lever is rocked rearwardly and its toe or extension acts on the free limb of the spring, and thus makes the same active, so that after the recoil energy has expended itself the spring reacts, throws forward the lever again and returns the breech-block and carriage and also the barrel to their normal positions.

To provide for the ejection of the cartridge-shells as they are withdrawn from the chamber by the extractor-limb in the rearward movement of the breech-block, the inside of one of the walls of the body may be provided with an inclined and outstanding rib or feather $r$, (the breech-block having a corresponding groove $r'$ working thereon,) whose forward end is located on the opposite side of the breech to the extractor-limb and comes within the path of the rim of the cartridge, so that when the said rim is made to strike forcibly against this feather end after being extracted it is tilted up and ejected and flirted sidewise out of the opening between the barrel and the breech-block.

The combination safety-slide is arranged to provide for locking the breech-block by hand in either its closed or its open position and also to lock the hammer at "safe" when cocked. This device consists of a slide or bolt $s$, adapted to work (preferably vertically) in a suitable slot $s'$, formed in one of the sides of the pistol-body and leading through into the raceway wherein the carriage reciprocates. On the inner side of the slide is a projection $s^2$, which by the lifting of the said slide by means of an external pusher $s^3$ is raised into the inside of the raceway and according to whether the breech-block is closed or open so the said part $s^2$ is made to engage with one or other of a pair of notches or recesses $s^4$ $s^5$, formed in the side of the breech-block carriage at points corresponding to the open and closed positions of the said block, so that when the slide is lifted into engagement with the rearward notch $s^4$ the breech-block is locked in its closed position, whereas when the said slide is in engagement with the forward recess $s^5$ (which can only occur when the carriage is at the end of its outward movement) the said block is fastened in its fully-opened position. This slide is also so arranged with respect to the lock mechanism that when in engagement with the rearward recess for securing the breech-block in the closed position it also serves to lock the hammer at "safe" when full-cocked, this being performed by means of an internal part of the slide being brought by the upward movement behind the hammer-sear $f'$, which is thereby blocked against being taken out of bent with the cocked hammer. Thus the sear, which is located behind the magazine-chamber and has a rocking motion, is pivoted upon a pin $f^2$, disposed between the cheeks $a^5$ in front of the hammer-pivot $f^3$, and in order to provide for its actuation from the trigger in front of the said magazine-chamber by means of the bar $g$ the said sear is provided with a hanging extension or tail $f^4$, which comes behind the rear end of the bar $g$ and is located and arranged to work within a recess $f^5$, formed in the framework of the grip $d$ and sufficient clearance or space is left between the back of the said sear-tail and the rear wall of the recess to admit of a lump or projection $s^6$ at the lower end of the safety-slide passing behind the sear-tail, as shown in Fig. 5$^A$, on the said slide being raised by means of the external pusher, and thereby the sear is blocked and the firing mechanism rendered inoperative simultaneous with the locking of the breech-block in its closed or its open position by the engagement of the part $s^2$ of the slide with the recess $s^4$ or the recess $s^5$, as the case may be.

In firing automatic pistols, such as herein described, it sometimes happens that the shooter exerts an involuntary and second pull upon the trigger consequent upon the recoil arising from the previous discharge, and thus the next cartridge is liable to be prematurely and unintentionally fired. To obviate this, means are provided for positively placing certain parts of the lock mechanism out of action and retaining them in this condition until the breech-block has completed its outward and return movements, so that the pistol cannot be discharged involuntarily. As already stated, the motion of the trigger is transmitted to the hammer-sear through the bar $g$, whose forward end is jointed at $g'$ to the back of the trigger, while its rear end impinges against the tail $f^4$ of the rocking sear $f'$ on the said trigger being pressed back, and in order to immediately take this bar clear of the sear after the latter has been taken out of bent its joint end is provided with a small cam or projection $g^2$, which on the trigger being pulled back and immediately after the sear has been actuated and taken out of bent with the hammer is made to impinge against the back of the trigger-guard, and thereby tilt the bar downward into the inoperative position, as represented in full lines in Fig. 3, while in order to retain the said bar in this depressed position during the rearward and return motions of the breech-block an auxiliary limb or pin $u$ is arranged to slide in suitable guides in the body, with its lower end $u'$ impinging upon or connected with the bar $g$, while the upper end is acted upon by the carriage at the commencement of its rearward movement. Thus the carriage has a suitably-disposed recess $u^2$ in which the upper end of the limb or pin $u$ lies when the parts are in position ready for firing, and after the discharge the said carriage in its back motion causes the curved edges of the recess to wipe over the upper end of the limb, which is forced out of the said recess and moved downward against the transmission-bar, whereby the said bar is held clear and out of contact with the sear, as shown in Fig. 3, and is retained in this inoperative position by an unrecessed part of the carriage working backward and forward over the upper end of the limb, and it is not until the carriage has completed its movement and the breech-block is closed that the recess comes again over the end of the limb and allows the same to rise, so that when the finger-pressure on the trigger is relieved the transmission-bar can be restored to its normal position by its spring $g^3$. It is understood that as soon as the auxiliary limb $u$ moves the transmission-bar from the sear the latter is free to be taken by its spring $f^6$ back to the proper position for falling into bent, with the hammer on the pistol being recocked by the back motion of the breech-block, and thus any involuntary pressure or pull action of the finger on the trigger is prevented from operating the sear through the transmission-bar. The spring $g^3$, which restores the bar $g$ to its normal position when the trigger is released, also serves as the trigger-spring for taking back the said trigger when the finger pressure is relieved.

In order to provide for the removal of the barrel with the breech-block and carriage from the body, the spring-buffer stop, which is engaged by the barrel-latch, is made capable of a raising and lowering movement to admit of its nose end being withdrawn from the recess of the latch, and thus leave the barrel and breech-block free to be withdrawn together from the body. This may be effected by mounting the said stop upon an eccentric-block $v$, pivoted by the fulcrum-pin $j'$ in the frame and having a notched head $v'$ in a convenient external position, the notch of which may be engaged by a coin or suitable tool and rotated bodily with the internal eccentric in one direction or the other for raising and lowering buffer-stop and fastening or releasing the barrel, as the case may be.

The application of the invention to other automatic firearms differs in no essential respect from its application to an automatic pistol, as herein described.

Having fully described my invention, what

I desire to claim and secure by Letters Patent is—

1. In an automatic firearm, a barrel held positively thereon but capable of a limited reciprocating motion bodily, a reciprocating breech-block for operating the barrel, and also having an independent motion, the movement of the breech-block placing the breech-block bolt in such position as to admit of the same being automatically disengaged from and engaged with the barrel by the action of the reciprocating parts in the opening and closing of the firearm, a rocking barrel-latch mounted on the barrel having double-acting cams thereon and a locking-notch, a stop on the body of the firearm for engagement by the latch-notch, the latch when engaging the stop permitting the limited reciprocating movement of the barrel bodily with the breech-block and also to provide for arresting and locking the said barrel in its rearmost position during the independent reciprocation of the breech-block, and means coöperating with the rocking barrel-latch for automatically placing the latter in a position to allow the barrel to be returned or moved forward with the breech-block after said breech-block has completed its independent forward movement.

2. In an automatic firearm, a barrel positively confined to the body, but capable of a limited reciprocating motion bodily, a reciprocating breech-block for operating the barrel and also having a motion independent of the barrel, a rocking barrel-latch mounted on the barrel having a stepped recess and double-acting cams thereon, and a stop carried by the body of the firearm for coöperation with the recessed portion of the latch, the recess being of such length as to admit of the limited reciprocating motion of the barrel, and the stepped construction providing a locking-notch automatically engaged by the stop when the latch is depressed to arrest the barrel at the end of its rearward movement, the barrel being held in arrested position during the independent rearward traverse and return movements of the breech-block, and the latch automatically lifted to permit the barrel to be returned to its normal position when the breech-block completes its said independent movements.

3. In an automatic firearm, a barrel positively confined to the body thereof, but capable of a limited reciprocating motion, a reciprocating breech-block for operating the barrel and also having a movement independent of the barrel, a barrel-retaining locking rocking device or latch carried by the barrel and having double-acting cams thereon, and also provided with a locking-notch, and a reciprocating supporting device for the breech-block having inclined wiping means thereon, whereby, when the breech-block commences its independent rearward movement, the barrel-latch is automatically depressed to throw the notch of the latch in engagement with the stop to retain the barrel in immovable position while the breech-block is completing its independent forward and rearward motions, the latch being automatically arranged to disengage the barrel and permit the latter to assume its normal position when the breech-block reaches the end of its independent return movement.

4. In an automatic firearm, a barrel confined to the body, but capable of a limited reciprocating motion, a reciprocating breech-block carriage disposed in the body and carrying a breech-block, the said carriage having inclined cam devices, a locking-latch mounted on the under side of the barrel and provided with double-acting cams to engage the cams of the breech-block carriage, and a stop device on the body of the firearm with which the latch coöperates.

5. In an automatic firearm, a barrel provided with a latch device confined to the body, but capable of a limited reciprocating motion and provided with a recess, a reciprocating support carrying a breech-block, and a sliding bolt mounted in the support and adapted to normally engage the recess in the barrel, the bolt, barrel and body of the firearm having inclined coöperative devices so arranged that when the barrel and breech-block carriage are moved rearward by recoil energy, and the barrel has been arrested and diametrically locked to the body by the latch device, the said bolt is automatically depressed and disengaged from the barrel to release the breech-block and permit independent rearward and forward movements of the latter, the inclined devices on the several parts operating, on the return of the reciprocating mechanisms set forth to their normal position, for raising the bolt again into engagement with the barrel and locking the breech-block thereto.

6. In a firearm, the combination with a stationary frame or body part, of a barrel capable of a limited reciprocating movement relatively to the frame or body, a latch on the barrel to engage a part of the body, a reciprocating breech-block carriage having a breech-block, a bolt mounted in the breech-block carriage and capable of free vertical movement, the bolt operating to lock the breech-block to the barrel, the latter having a depression in the under side of a portion thereof and the frame or body provided with a bottom clearance, inclined planes being formed on the bolt, the barrel back of the notch in the latter and at the forward end of the bottom clearance in the body, said inclined planes operating to receive and lower the bolt, and an elevated member at the forward part of the bottom clearance which normally lies underneath the bolt and retains the same in locking engagement with the barrel.

7. In an automatic firearm, a stationary body, a reciprocating breech-block, a barrel having a limited sliding movement, a barrel-latch, the latch having a stepped notch and double-acting cams, a stop carried by the body of the firearm, and a breech-block bolt, all mounted and arranged to coöperate substantially as and in the manner and for the purposes herein described.

8. In an automatic firearm, the combination with a body having a stop thereon, of a reciprocating breech-block, a barrel having a limited sliding movement, a barrel-latch having a notch formed to permit the limited movement of the barrel and also provided with double-acting cams, a breech-block bolt, and mechanism for returning the said breech-block to its normal position after its rearward traverse, consisting of a long arm or lever pivoted to the body and having one end engaging the breech-block, and a double-armed spring against which the remaining end of the arm or lever has bearing.

9. In a lock mechanism for an automatic firearm, the combination with a body and a sear-actuating arm or bar pivoted to the trigger and provided with a cam or projection, which, when the trigger is pulled, impinges against the fixed part of the firearm and tilts the bar into an inoperative position, of an auxiliary sliding limb mounted in the body and connected at one end to the sear-actuating bar, and a breech-block carriage having a breech-block thereon, and provided with a recess or clearance with which the other end of the sliding limb engages, the breech-block when forced back by recoil energy causing an unrecessed part thereof to traverse over the end of the sliding limb to depress the latter and serve as a means, additional to the cam on the sear-actuating bar, for retaining the said bar in its inoperative position until the breech-block has returned to its fully closed and locked position.

In testimony whereof I have hereunto set my hand in presence of two subscribing witnesses.

WILLIAM JOHN WHITING.

Witnesses:
ARTHUR SADLER,
EDITH HELLABY.